July 17, 1928.

G. C. SNYDER 1,677,735

METHOD OF AND MACHINE FOR CONDITIONING SHEET ARTICLES AND OF AND FOR APPLYING MINOR MEMBERS TO SHEET ARTICLES, SUCH AS ENVELOPES FOR EXAMPLE

Filed Oct. 2, 1924

INVENTOR.

George C. Snyder.

BY Geo. L. Wheelock

ATTORNEY.

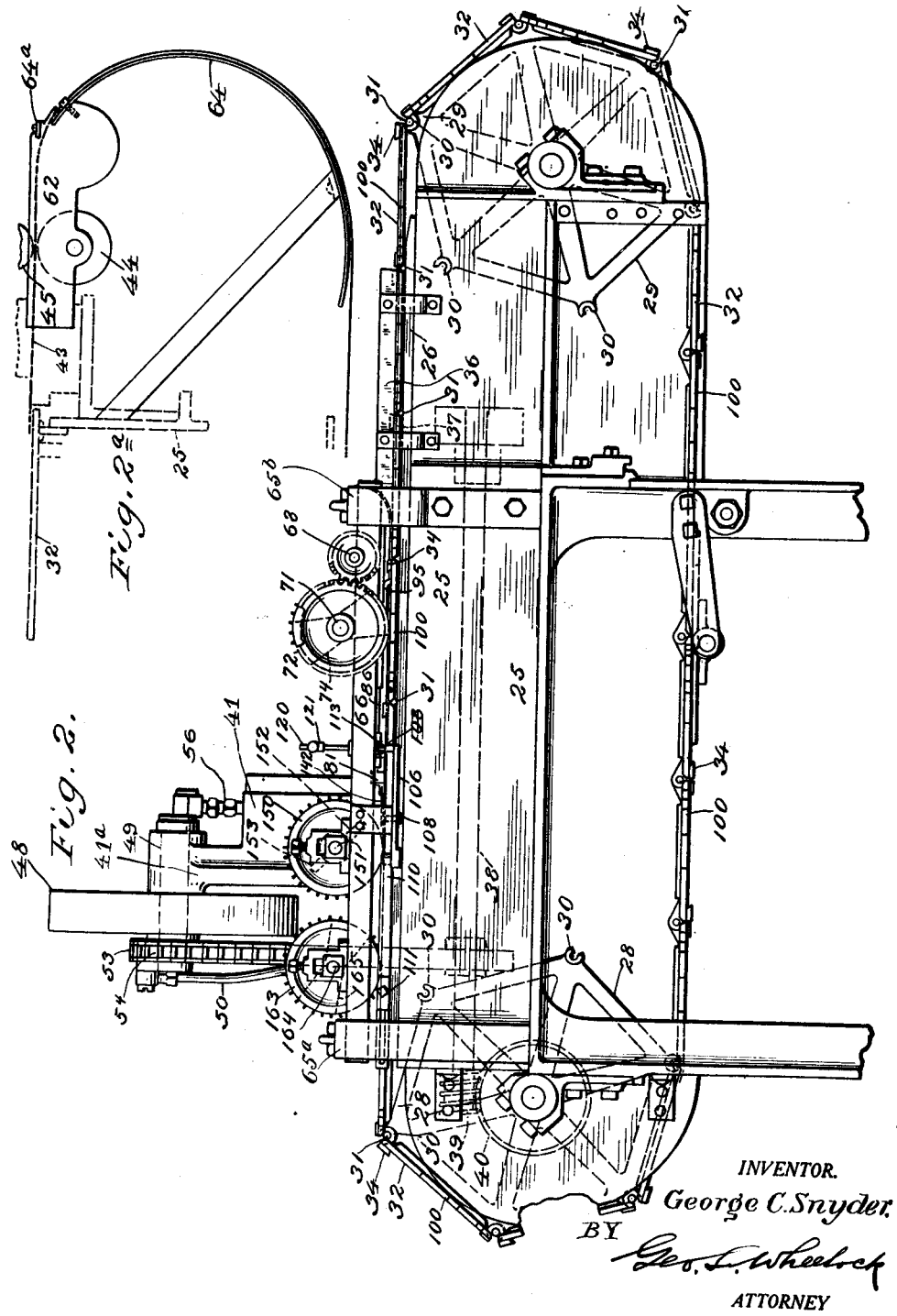

July 17, 1928.
G. C. SNYDER
1,677,735
METHOD OF AND MACHINE FOR CONDITIONING SHEET ARTICLES AND OF
AND FOR APPLYING MINOR MEMBERS TO SHEET ARTICLES,
SUCH AS ENVELOPES FOR EXAMPLE
Filed Oct. 2, 1924
11 Sheets-Sheet 3
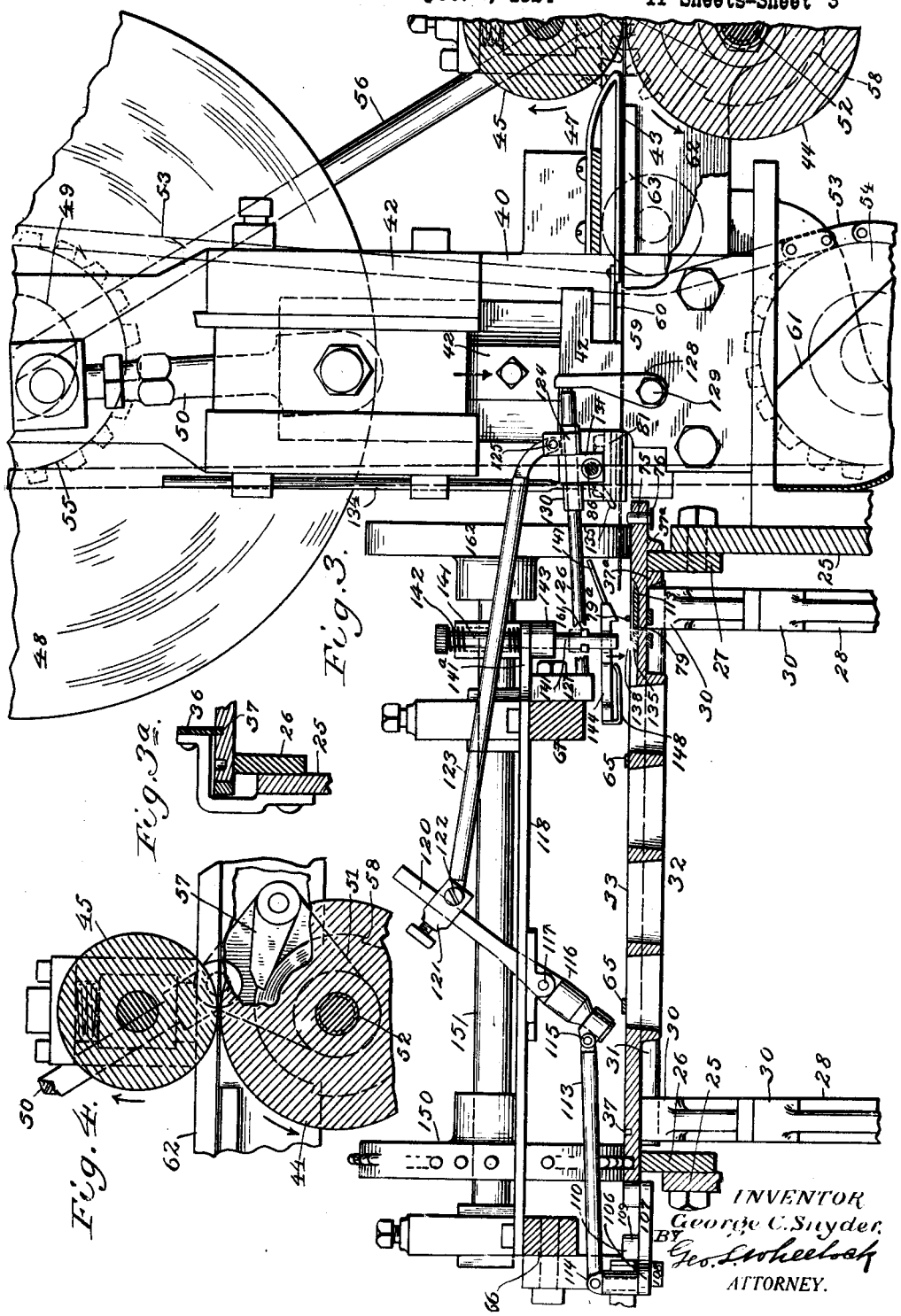
INVENTOR
George C. Snyder,
BY
Geo. S. Wheelock
ATTORNEY.

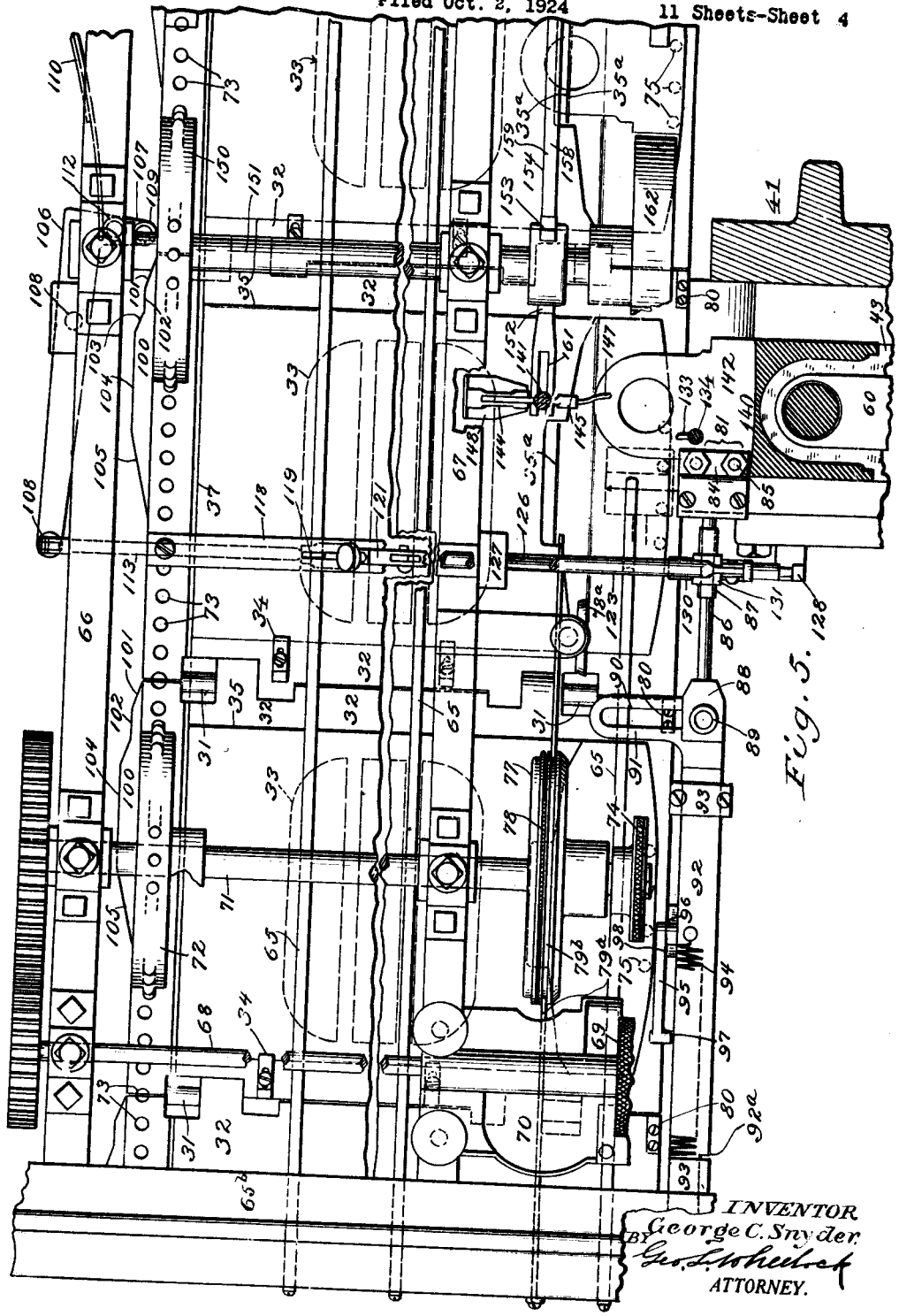

July 17, 1928.
G. C. SNYDER
1,677,735
METHOD OF AND MACHINE FOR CONDITIONING SHEET ARTICLES AND OF
AND FOR APPLYING MINOR MEMBERS TO SHEET ARTICLES,
SUCH AS ENVELOPES FOR EXAMPLE
Filed Oct. 2, 1924      11 Sheets-Sheet 5
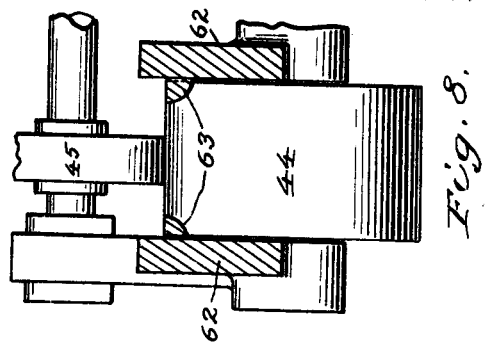
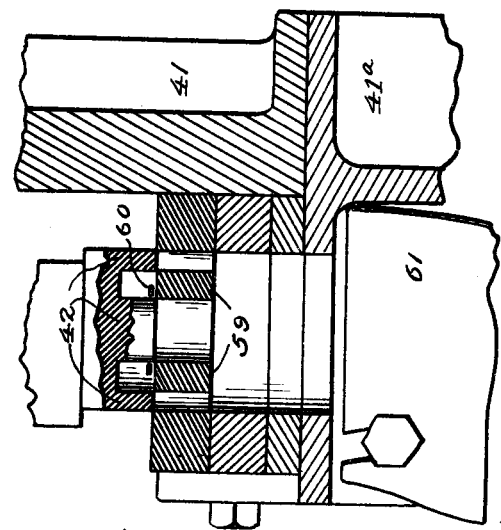
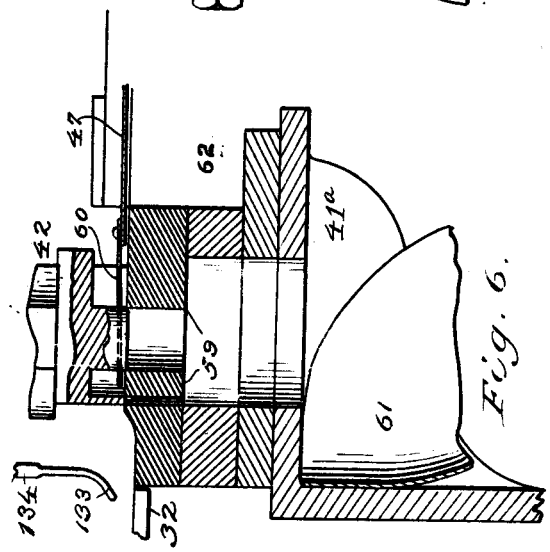
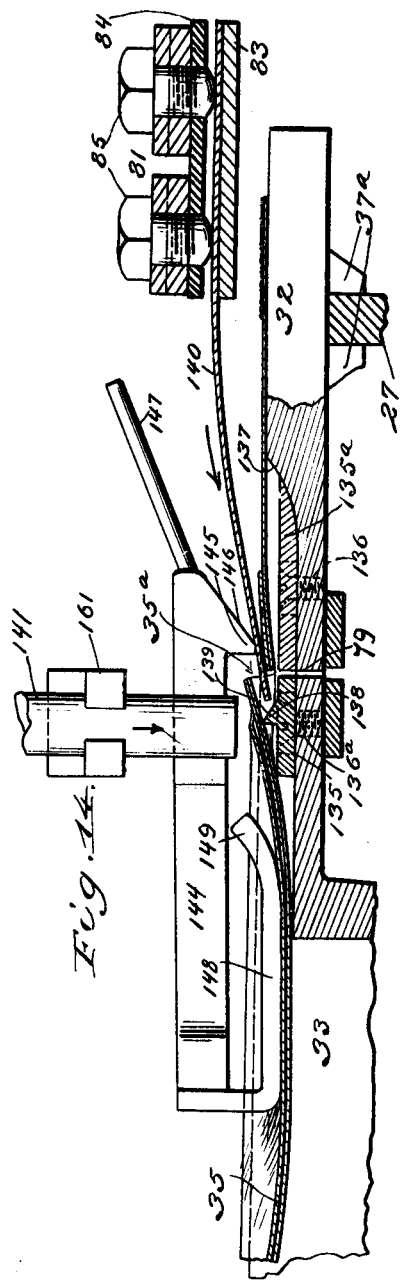
INVENTOR
George C. Snyder.
BY
ATTORNEY

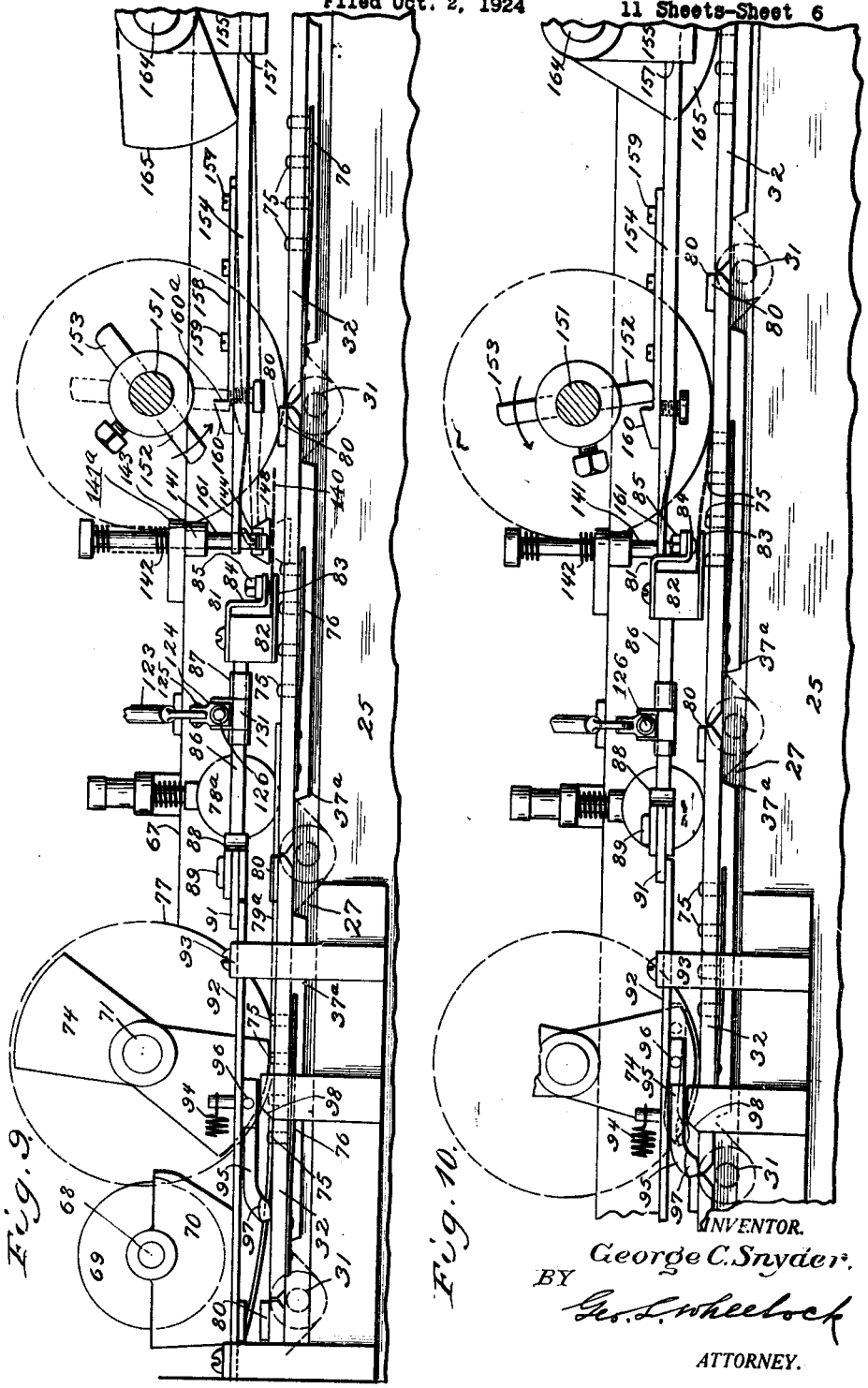

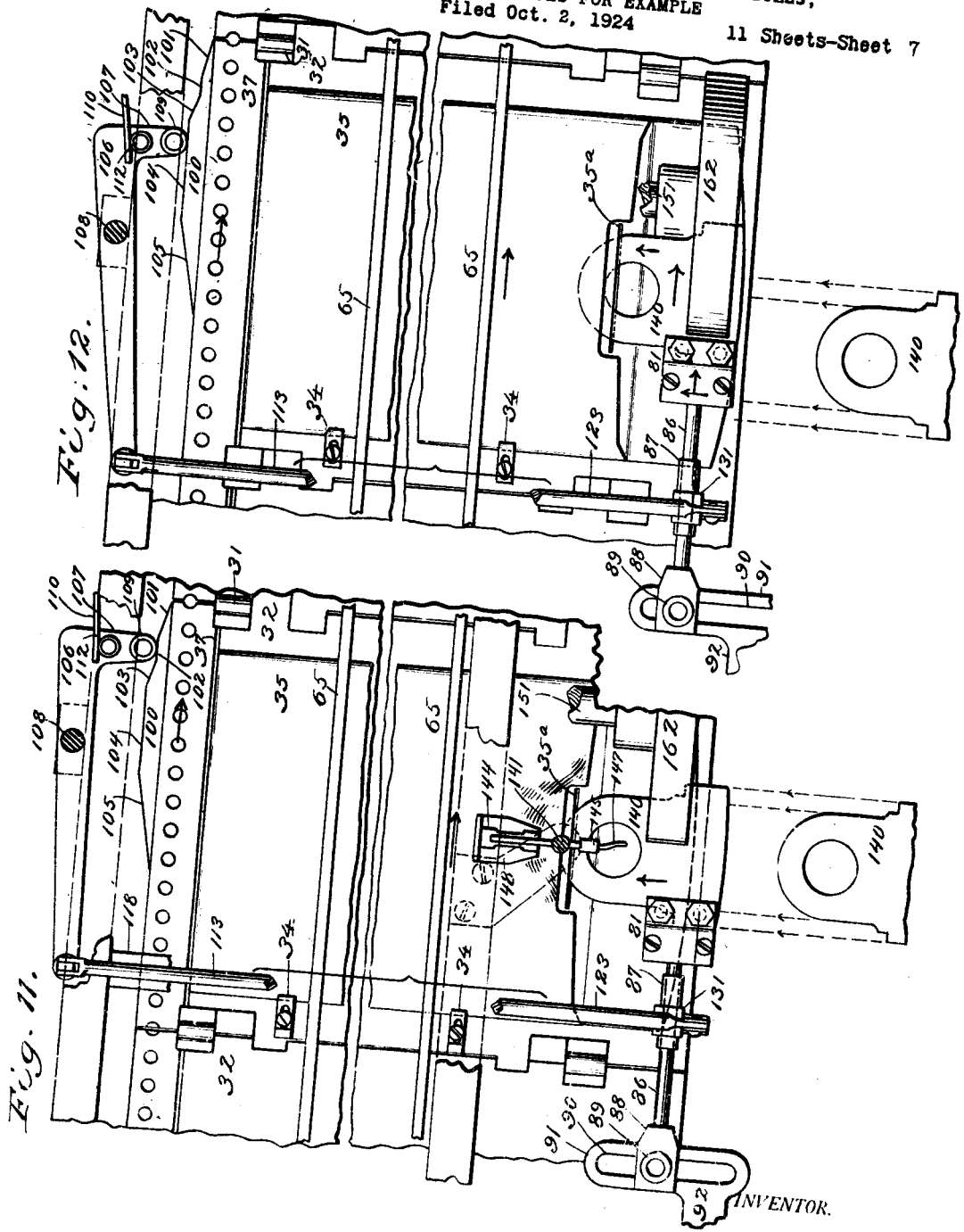

July 17, 1928.
G. C. SNYDER
1,677,735
METHOD OF AND MACHINE FOR CONDITIONING SHEET ARTICLES AND OF AND FOR APPLYING MINOR MEMBERS TO SHEET ARTICLES, SUCH AS ENVELOPES FOR EXAMPLE
Filed Oct. 2, 1924
11 Sheets-Sheet 8
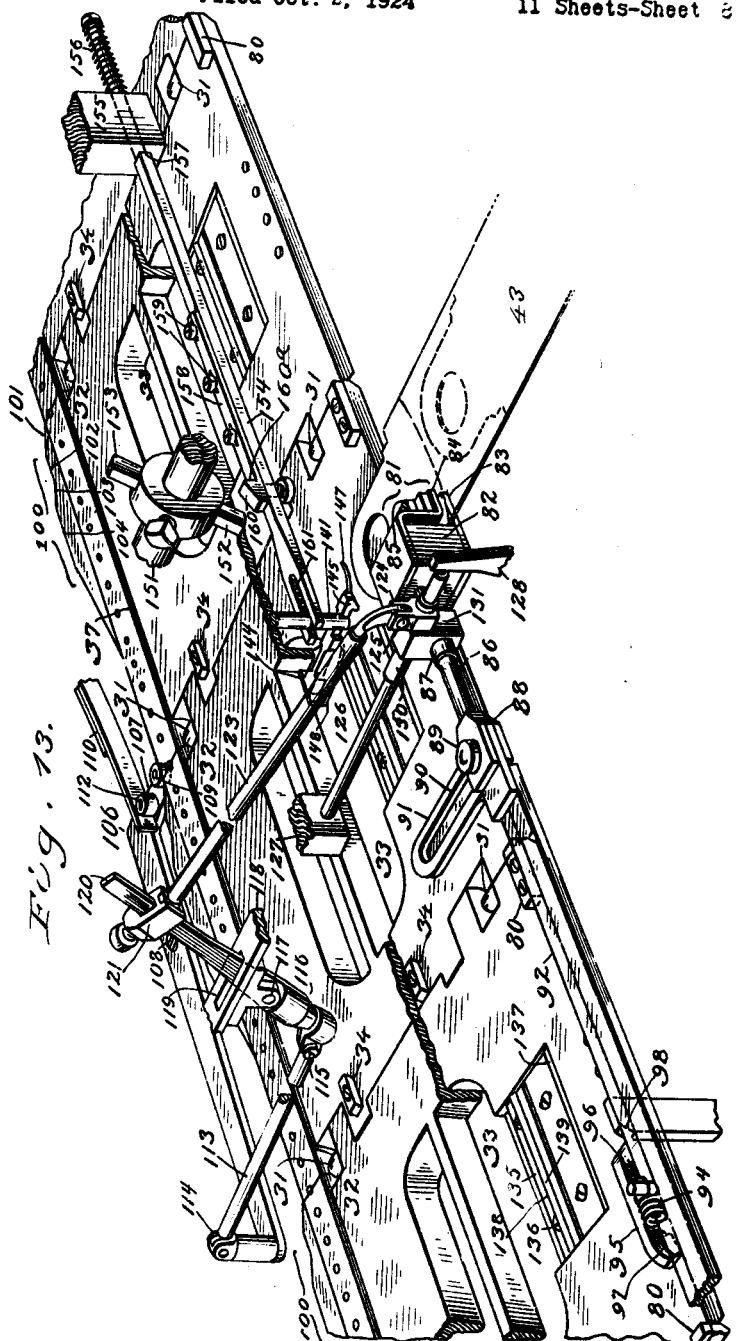
INVENTOR
George C. Snyder.
BY Geo L Wheelock
ATTORNEY.

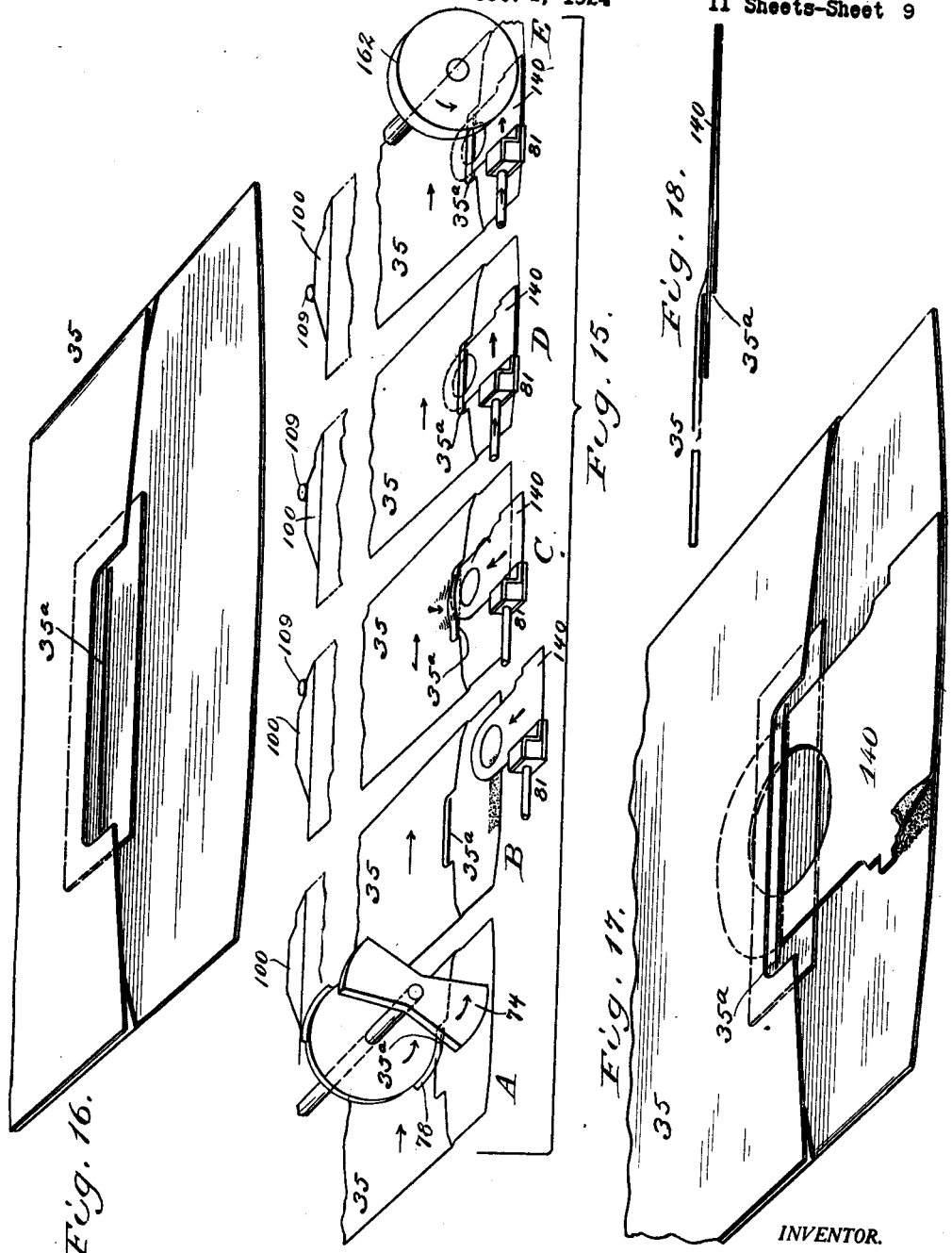

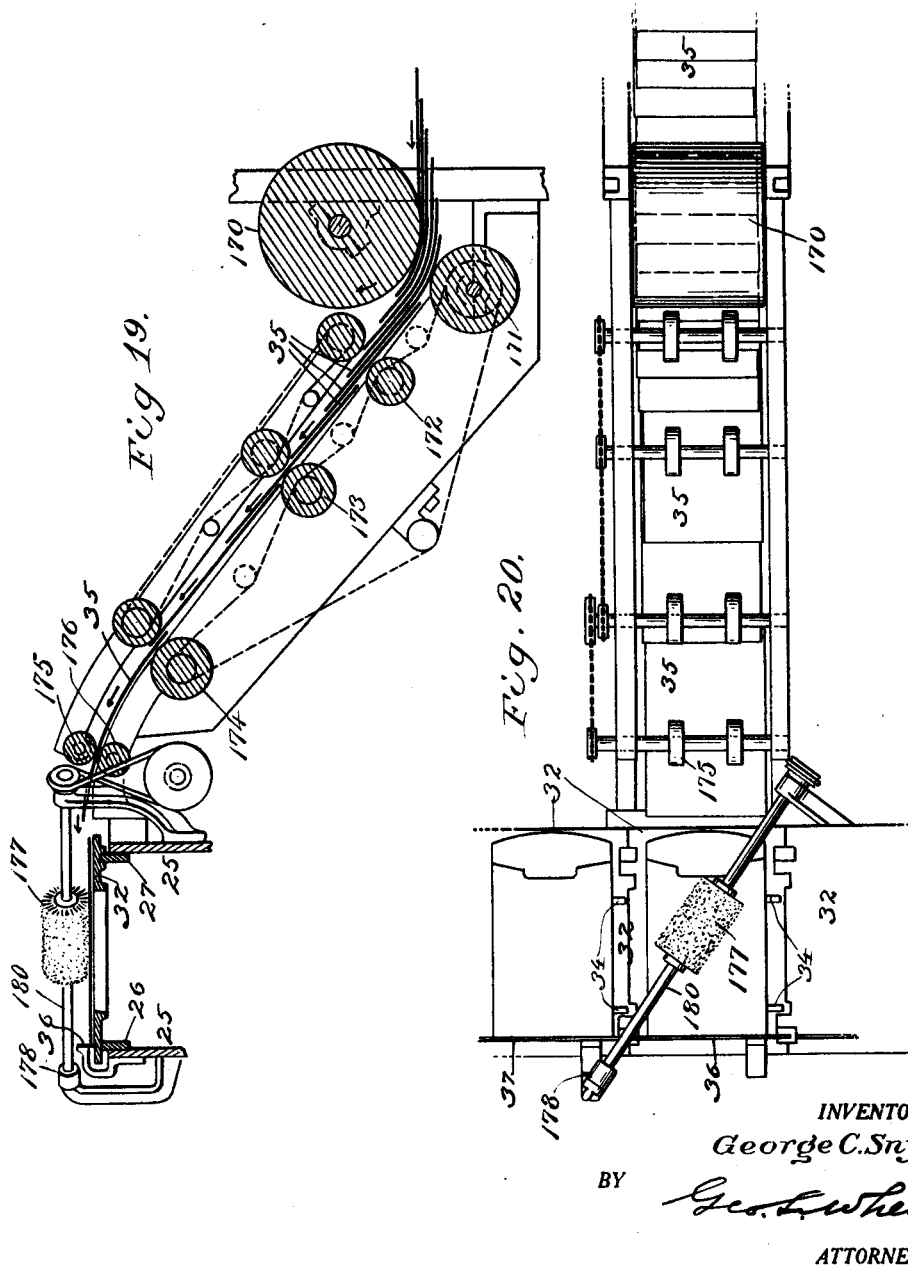

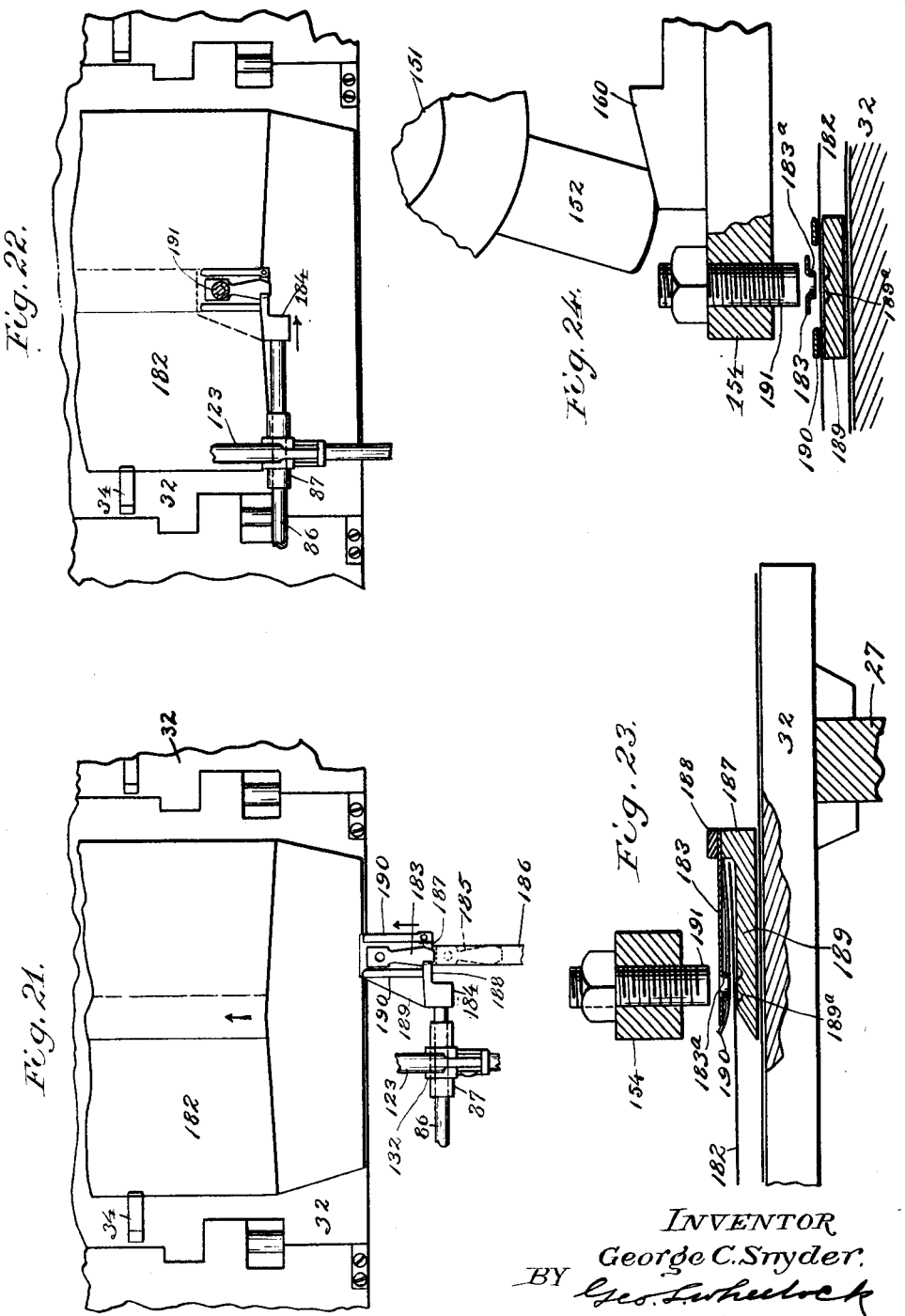

Patented July 17, 1928.

1,677,735

UNITED STATES PATENT OFFICE.

GEORGE C. SNYDER, OF NEW YORK, N. Y., ASSIGNOR TO KAELMA MANUFACTURING COMPANY, INC., OF NEW YORK, N. Y., A CORPORATION OF NEW YORK.

METHOD OF AND MACHINE FOR CONDITIONING SHEET ARTICLES AND OF AND FOR APPLYING MINOR MEMBERS TO SHEET ARTICLES, SUCH AS ENVELOPES, FOR EXAMPLE.

Application filed October 2, 1924. Serial No. 741,180.

My invention relates to a method of conditioning sheet articles, such as envelopes for example, by operating upon them preferably while the articles are continuously moving, and also to a machine for performing such method, more particularly but not necessarily with a view to conditioning envelopes so that minor members, such for example as closure members, which may be in the form of handles, may be applied to the envelopes or the like during such preferable continuous movement thereof. The method and machine assumes this broad aspect because it is practical under the invention to condition paper or other envelopes or other sheet articles which do not necessarily include the application of additional materials or attachments, etc. to the envelopes or the like.

Specifically, the present invention is applicable in connection with the manufacture of the handled envelopes which forms the subject matter of my application, Serial No. 668,992, filed October 17, 1923.

The general and specific objects of the invention will be apparent to those skilled in the allied arts from the accompanying specification and the drawings which illustrate a preferred and a modified form of the invention, the novel features of which are contained in the appended claims, and in which drawings,—

Fig. 2 is a side elevation of the machine;

Figure 1:
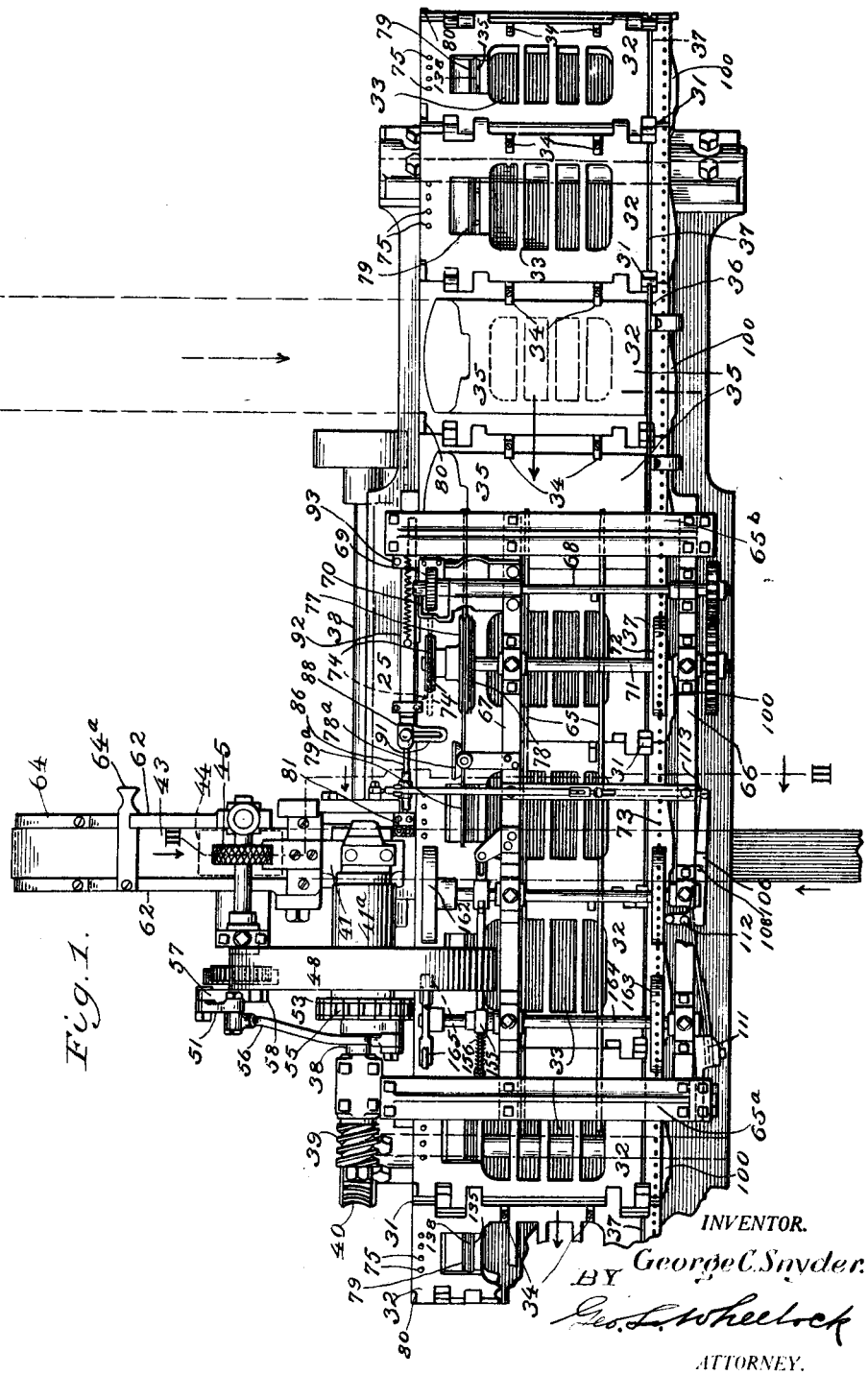
Fig. 1 is a plan view of a machine adapted for carrying out the method and indicating by dotted lines and an arrow, the preferred position of means for delivering articles to the machine.

Fig. 2ª is a detail of means for guiding a paper strip and showing parts of the machine in dotted lines;

Fig. 3 is an enlarged transverse section of the machine on the line III—III, Fig. 1, parts being broken away;

Fig. 3ª is a sectional detail, showing gage and co-operating platen;

Fig. 4 is a sectional detail of the strip feeding rolls, partly broken away;

Fig. 5 is an enlarged plan partly in section and broken away, showing certain details of the machine in normal position;

Fig. 6 is a vertical section of the main elements of a strip feeding and minor member punching mechanism;

Fig. 7 is a vertical section at right angles to Fig. 6;

Fig. 8 is a sectional detail showing the strip feeding rolls of Fig. 4;

Fig. 9 is an enlarged detail side elevation of a considerable portion of the machine, showing article conditioning and minor member applying parts, and in which certain working parts of the machine may be assumed to be in normal position;

Fig. 10 is a similar side elevation in which the working parts are shown in another position;

Fig. 11 is an enlarged detail plan view illustrating some of the working parts, and to show how a minor member may be preliminarily inserted into a perforation in an article;

Fig. 12 is a detail of the same parts illustrated in Fig. 11, showing them in different position, and in which the minor member has been fully inserted;

Fig. 13 is a perspective view of platens and some of the working parts showing more in detail how the working parts apply a minor member to an article;

Fig. 14 is an exaggerated sectional detail view to show clearly how an article which is slitted may be conditioned or buckled at the slit, to facilitate the insertion of a minor member into the slit;

Fig. 15 is a diagrammatic perspective view to illustrate successive steps in conditioning articles, such as envelopes for example, and for applying and permanently connecting the minor members to such articles;

Fig. 16 is a detail perspective view showing the slitted end of an open envelope having a closure flap at its mouth;

Fig. 17 is a similar perspective view in which a handle is shown as permanently attached to the flap of the envelope.

Fig. 18 is a section of Fig. 17 longitudinally through the handle of the envelope;

Fig. 19 is a diagrammatic side elevation partly in sectional detail to illustrate means for conducting articles, such as envelopes for example, from an envelope making machine, to the machine of the present invention;

Fig. 20 is a plan view of the parts shown in Fig. 19;

Fig. 21 is a plan illustrating a modified form of gripper means for applying metallic clasp fasteners to envelopes of the clasp-envelope type, the gripper means being shown as having just received a fastener from the strip feeding and punching device.

Fig. 22 is a similar plan showing a clasp envelope, the gripper means, etc., having just received a metallic fastener thereto.

Fig. 23 is an enlarged sectional detail of the modification, showing an envelope about to have a metallic fastener permanently secured thereto; and Fig. 24 is a sectional detail transverse to Fig. 23, showing the riveter more fully.

*Article conveyor mechanism.*

Referring to Figs. 1, 2, 3 and 5 in particular of the drawings, the machine is provided with a frame 25 on which a pair of parallel track rails 26, 27 are mounted rigidly. At the ends of the frame are preferably hexagonal sprocket wheels 28, 29 which are respectively fixed on shafts 28ª, 29ª that extend transversely of and are mounted on the frame 25. The sprocket wheels are provided with spaced recessed lugs 30, in the recesses of which engage the pivots 31 of the hinges which connect the links 32 of the endless chain conveyor which carries the articles from the receiving to the discharge end of the machine. These links are also clearly shown in Figs. 9 to 13 inclusive. Each of the links constitutes a platen adapted to support the article to be conditioned and while a minor member is being applied, and, for the sake of lightness, each link-platen may have openings 33. However, it is obvious that in practice each platen may have an unperforated surface for supporting the article.

Preferably, each link-platen 32 is provided with gaging means at its receding edge for the purpose of engaging the rear edge of the article supported on the platen, such means being preferably in the form of recessed and adjustable gage lugs 34, so that the edge of the article may engage in the recesses. It is assumed that the machine of the present invention is to condition envelopes, and hence, envelopes 35 are illustrated, and it is also assumed that the envelopes are to be provided with perforations 35ª which here take the form of slits. For the purpose of gaging those edges of the articles which are not gaged by the gage lugs 34 but are at right angles thereto, a stationary side gage 36 may be mounted on that portion of the frame of the machine towards which the articles are delivered as from an envelope machine, for example. The lower edge of the side gage 36 enters a groove 37 in each link-platen as the conveyor or endless chain travels. The link-platens 32 are provided with guides 37ª which engage the parallel track rails 26, 27, and guide the link-platens in a straight line.

The present invention is specifically shown as conditioning envelopes for the attachment of minor members, the envelopes being illustrated as slitted transversely, in the walls which support the closure flaps, (see Fig. 16) to facilitate the application to each envelope of a closing and carrying handle which is securely attached directly to the outer end of the flap (see Figs. 17, 18). One form of such envelopes with a carrying handle is shown and described in my aforesaid application.

The travelling conveyor or endless chain is shown as driven from a main power shaft 38 which is mounted in bearings along one side of the frame 25, and on said shaft there is fixed a worm 39 that is in mesh with a worm wheel 40 fixed on shaft 28ª of the conveyor, so that, in the preferred form of the invention, a continuous feed motion without halt may be imparted to the conveyor.

*Strip feeding and handle forming mechanism.*

This mechanism is more particularly illustrated in Figs. 1 to 4 inclusive and Figs. 6, 7 and 8. A punch frame 41 is supported on the main frame 25 and carries a supporting bracket 41ª in which moves a punch 42. The punch is to punch and strike out minor members, such as handles for example, from a strip 43 of sheet material, which in the case of the formation of handles for envelopes would be paper or the like, preferably stiffer than the material of the envelopes. Intermittently rotatable mutually geared rolls 44, 45 are provided for feeding the strip 43 to the punch, and the strip may be supplied from a suitable roll of strip material. The punch frame supports a horizontal guide 47 for guiding the strip to the punch. A fly wheel 48 is mounted on the crank shaft 49 which carries a pitman rod 50 which is pivoted to a link 51 loosely mounted on shaft 52 of the strip feed roll 44 so that it may be oscillated. A sprocket chain 53 passes over sprocket wheels 54, 55, respectively, fixed on the main power shaft 38 and the crank shaft 49 that operates the punch. For operating the punch, the crank shaft 49 is connected by a pitman rod 56 thereto.

The geared feed rolls 44, 45 are operated from the link 51, to which end there is pivoted thereon a pawl 57 adapted to engage with a ratchet wheel 58 that is fixed on the shaft 52. The punch 42 is adapted to cooperate with a stationary die 59 for the purpose of forming minor members, such as handles, from the strip 43. Associated with the punch is a stripper plate 60 which is adapted to disengage the punched-out member from the punch. A discharge chute 61 is provided for conducting the waste material from the punch. It is obvious that the punching mechanism described is only one of the many conventional forms which may be employed; with an intermittent feed of strip, however. For supporting the feed rolls 44, 45, the punch frame is provided with brackets 62 and these brackets, at the delivery side of the feed rolls, are provided with paper supporting ledges 63. As shown more particularly in Fig. 2$^a$, a curved strip guide 64 is provided which is fixed rigidly to and hangs below the brackets 62, so that it is located between the feed rolls and the roll of strip material. The strip guide 64 is preferably provided with a retaining latch 64$^a$ to hold the strip in place while it is moving.

As specifically shown and described, the punch mechanism is more particularly adapted for punching and striking out handles or other closure members for envelopes or the like from a strip of sheet material and for feeding the strip intermittently, as well as for holding the handles until each of them has been gripped by another feature of the present invention, the punching mechanism being so timed that a handle is not released until it has been gripped.

*Perforating and gumming the articles such as envelopes.*

The mechanism for this purpose is clearly illustrated in Figs. 1, 2, 5, 9 and 10, which illustrate instrumentalities which are preferably timed to the movement of the conveyor chain for the purpose of conditioning the envelopes or other articles. In order to hold the articles or envelopes 35 against the gages and in proper registration with the platens of the endless conveyor, slightly yielding hold-down friction strips 65 extend longitudinally of the frame 25 directly above the upper lap of the endless chain. The forward ends of the hold-down strips 65 are rigidly attached to the cross-bar 65$^c$ of the cross-bars 65$^a$, 65$^b$ which are rigidly supported on supporting bars 66, 67 that extend longitudinally of the machine and are rigidly fixed to the frame 25. The hold-down strips 65 are free towards the outgoing end of the machine and serve to hold the articles, such as envelopes, flat against the platens while the gages 34 push the envelopes through the machine and overcome the friction of the hold-down strips. Thus, without the use of any additional means for holding the envelopes in place, the envelopes are free to fall from the machine by their own gravity as they pass away from under the hold-down strips by turning downward around the rear sprockets of the endless chain.

Preferably, there is mounted in bearings on the stationary supporting bars 66, 67, a transverse shaft 68 on one end of which there is fixed a gum transfer-wheel 69 adapted to take gum or paste from the gum reservoir 70. A shaft 71 is geared with shaft 68 and at one end it is provided with a toothed wheel 72, the teeth of which are in intermeshing engagement at all times with holes 73 in the link-platens. Mounted on the other end of shaft 71 is a gummer 74 to which gum is transferred by the transfer wheel 69. The object of the gummer 74 is to apply a stripe of gum to each of the articles as they are moving continuously under the gummer 74, and in the case of closure flap envelopes, the gum would be applied in stripes to the outer ends of the flaps.

In this connection, it may be stated that it will be obvious to envelope manufacturers that the stripes of gum may be applied by the envelope machine to that portion of the paper from which the envelope closure flaps are made, or to the said flaps when the envelopes are being made, and before they reach that portion of the present machine to which the envelopes are delivered from the envelope machine.

At that side of the machine on which portions of the articles to be gummed are located, and along which they move, the corresponding end of each platen-link is preferably provided with slightly projecting movable studs 75 having rounded contact ends and adapted to raise the closure flap above the level of each platen for the gumming operation, the gummer 74 not extending far enough downward to contact with the face of the platen, and the studs 75 being supported on flat springs 76 which project the rounded ends of the studs through holes in the platen. The studs 75 move inward when pressed by a minor member attaching roller to be subsequently described. Thus, in the event that an article should be missing from a platen no gum from gummer 74 can touch the platen.

The shaft 71 has rigidly mounted thereon a disk 77 preferably provided with two slitters 78. The object of these slitters is to slit the material of the articles, such as envelopes for example, in any form so long as the form of the revolving slitter corresponds with and fits into a slot 79 in the platen. In the specific machine illustrated, the slitters 78 will at 35$^a$ transversely slit those walls of the closure flaps of the envelopes to which the flaps are attached, and along a line parallel with the fold lines of the said flaps. The machine may furthermore be provided with a revolving scorer 78ª for forming the fold lines of the flaps in case the flaps have not already been provided with fold lines within the envelope making machine itself.

Preferably also, the machine is provided directly at one side of the slots 79 in the platens, with a hold-down wire 79ª which is fixed at one end to the bar 65ª and is free at the other end. The hold-down wire or the like may be held against undue lateral motion by having it engage in a groove 79ᵇ in the disk 77 to keep it close to the slitter while the slitting is being done, for the purpose of preventing the envelope or other article from being picked up by the revolving slitter and to prevent the material of the article from buckling or getting out of position during the slitting operation.

*Handle gripping and advancing mechanism.*

For a complete understanding of this portion of the machine, reference may be had to Figs. 1, 3, 5 and 9 to 13. In this embodiment of the invention, the minor members, such as handles, are intermittently fed in the direction of the running of the articles without interrupting the continuous progress of the articles past the location where the minor members are applied. Each link-platen of the travelling conveyor or endless chain is provided with a carrying lug 80 that is designed to ultimately advance the gripper, to be now described, in substantially the same direction as that in which the articles travel and also to maintain the advance until each handle has been properly inserted in each envelope.

A gripper 81 is provided, to which minor members, such as handles, are delivered one at a time from the punching mechanism hereinbefore described or from other mechanism designed to prepare minor members for application to articles. Preferably, the gripper 81 comprises a head 82 which carries a lower jaw 83 and an upper jaw 84, both jaws being preferably of spring metal and being rigidly secured to the head 82 so that the jaws oppose each other and are free to flex. The upper jaw is provided with a plurality of pressure screws 85 having rounded pressure faces or ends which project into the gap between the jaws. The gripper head 82 is carried by a shank 86 and said shank is provided with a fork 88 through which passes a pin 89 mounted in a slot 90 of a guide plate 91, so that the said shank and the gripper are prevented from rotating on the axis of the shank. The slot in the guide plate 91 and the said pin 89 will also permit the gripper and shank to have a movement lateral of the travelling movement of the link-platens past it.

Guide plate 91 is mounted on and extends laterally of one end of a bar 92, and said bar constitutes a push bar. The bar 92 is guided in guides 93 which are rigid on the frame 25 of the machine, and prevent the bar from rotating. For the purpose of retracting the bar 92 and to return it to normal position after it has acted as a push bar, one end of a spring 94 is attached to the bar and the other end is fixed to the cross-bar 65ᵇ. A gravitating dog 95 is pivoted to the bar 92 at 96 and is provided with a lateral tooth 97, said dog being adapted to be engaged successively by the lugs 80 on each link-platen. When this occurs, the bar 92 and the parts operated thereby will be pushed, at a speed equivalent to the speed of the platens, for a short distance until the tooth 97 of the dog comes in contact with a stationary tripping member 98 on the frame of the machine, which will act to release the dog from the pushing lug 80 so that the spring 94 will retract the bar 92 and the parts carried thereby and restore them to normal position. To stop the bar 92 in its retracting movement, it is provided with a shoulder 92ª which contacts with one of the guides in which the bar travels.

At this point, it should be stated that the gripper 81 begins to partake of a governing movement lateral of the direction of movement of the articles by the conveyor somewhat before the lug 80 on any link-platen comes in contact with the dog 95, and this mechanism will now be described.

*Gripper movement governing mechanism.*

This mechanism is best illustrated in Figs. 1, 3, 5 and 9 to 13 inclusive. Preferably, the means for initially governing and timing the governing movement of the gripper comprises a cam 100 on the end of each link-platen. Each cam may have suitable cam or pattern faces depending upon the nature of the movement it is desired that the gripper shall follow. As shown however, and for the specific purpose herein outlined, each cam 100 is provided with an inclined cam face 101 located at the forward end of the cam. It is furthermore provided with a dwell portion 102 and following that with a second inclined face 103. Following the cam face 103, there is an idle portion which forms a second dwell portion 104 and is much longer than the dwell portion 102. Following the second dwell portion 104, the cam is provided with a retraction or release incline 105.

A lever 106 is provided with a lateral projection 107 and is mounted on a pivot 108 which is fixed on the frame of the machine, and said lever has a long and a short arm, the lateral projection 107 being on the short arm and carrying a cam roller 109 which is adapted to come in contact, as hereinafter described, with the irregular pattern face of the cam 100. One end of a leaf spring 110 is rigidly mounted at 111 on the frame 25 of the machine and the other end of said spring bears upon a roller 112 on the arm 107.

A link 113 is connected by a universal joint 114 with the long arm of lever 106 and by a universal joint 115 with the lower end of a lever 116. Lever 116 is mounted on a pivot 117 carried by a cross-bar 118 that is rigidly secured to the supporting bars 66, 67 which extend longitudinal of the machine. The lever 116 projects above the pivot 117 through a slot 119 in the cross-bar 118, so that said lever 116 may be oscillated in one direction or the other. The longer upper arm 120 of the lever 116 has adjustably mounted thereupon a bearing block 121, provided with a pivot 122 on which is borne one end of a link 123 that is longer than the link 113. The other end of the link 123 is pivoted at 125 within the fork of a pivot block 124. A stationary guide rod 126 extends transversely of the direction of movement of the articles in the machine and one end is supported by a bracket 127 which is mounted on the supporting bar 67. The other end of the guide rod 126 is rigidly held by the upper end of a supporting arm 128, the lower end of which is pivotally mounted on the bolt 129, by the head of which the said arm 128 may be rigidly held to support the guide rod 126.

Guide rod 126 constitutes a support and guide for what might be termed a "shuttle". The shuttle may be said to comprise the guide 87, before referred to, for the shank of the gripper 81, the guide sleeve 130 and the body 131 which carries both of said sleeves rigidly. The parts of the shuttle may be made in one piece.

*Gripper movement governing mechanism with handle gripping and advancing mechanism.*

The manner in which the co-operation or synchronization of these two mechanisms takes place may perhaps be best understood by reference to Figs. 3, 5, 9 and 13. Referring to Fig. 5, the gripper 81 is shown in position for gripping a handle which has been just cut from, or is about to be cut from, the strip of which it is made by the punching mechanism. Before a handle, such as 140, is separated from the original strip of material by the punch which has already punched a hole in the adjacent portion of the strip, the feed rolls 44, 45 (Fig. 4) cause one edge of the forward perforated end of the strip to be advanced and inserted in between the rounded pressure ends of the screws 85 and the lower jaw of the gripper. It requires some pressure by the forward end of the strip to introduce the partially formed handle 140 between the rounded ends of the screws and the lower jaw of the gripper, but this pressing movement of the strip will not carry the gripper with it at all. This is due to the fact that the pressure screws 85 are so far away from the axis of the stationary transverse rod 126 on which the shuttle 89, 130, 131 is supported and in such relation to the diameter of such rod and the length of the sleeve 130 surrounding such rod (see Figs. 5, 9 and 10) that a locking action between the rod 126 and the said shuttle is effected by the pressure referred to, so that pressure directed in a line parallel to the strip material against the gripper 81, at the pressure screws 85, does not act to push the gripper along the transverse rod 126 but, on the contrary, acts to lock the gripper to the rod, and the harder the pressure exerted the tighter the gripper is automatically bound and locked in normal position for work upon the advancing envelopes.

Before the gripper 81 partakes of any movement, the punch 42 will have severed the handle 140 from the strip of material. The mechanisms which control the gripper are so timed with reference to the punching movement that the gripper will not commence to move until a handle has been completely formed and gripped. The endless conveyor being in continuous motion without interruption, the cams 100 on the link-platens will be moved in succession past the location in which the handles are advanced by the gripper and applied to the envelopes supported on the link-platens. As one cam 100 after the other reaches the predetermined location, the action of the mechanism will be as follows: The first cam face 101 of cam 100 will bear upon roller 109 on the lever 106 until the roller reaches the first dwell face 102 and will act to compress the spring 110. During this action by the cam face 101, the levers 106 and 116 are actuated and the link 123 operated so as to overcome the locking tendency of the shuttle and move the gripper 81, carrying the handle 140, from the position shown in Fig. 5 to the position shown in Fig. 11, which will effectuate a slight insertion of the terminal of the handle into the slit 35ª in the envelope. At a predetermined time during this movement, the pushing lug 80 on one of the platens will have come into engagement with the dog 95, with the result that the slide bar 92 is pushed along at the same rate of speed as the platens 32 are taking. Therefore, the gripper 81 carries the handle 140 in perfect time with the envelope, having the slit 35ª into which the handle has been preliminarily inserted, by reason of the before described movement which is controlled by incline 101 of cam 100.

By the time the roller 109 has reached the dwell face 102, the slit 35ª in the envelope will have been opened in the manner to be hereinafter described to permit the just described insertion of the terminal of the handle 140 into the slit. While the dwell face 102 is in contact with the roller 109, the opening up of the slit 140ª is being discontinued, and when the roller rides on the second inclined face 103 of the cam, the spring 110 is further compressed, and the lateral motion of the gripper 81 is continued for accomplishing the complete insertion of the terminal of the handle into the slit 35ª as shown in Fig. 12, but during this lateral movement, the envelopes are continuing their travel and the gripper 81 is likewise moving along at the same speed under actuation by the lug 80 and the dog 96. While the roller 109 is travelling upon the second dwell portion 104, the inward movement of the governing mechanism is discontinued, and the gripper and the handle are still moving at the speed of the platens, and they so move until the handle has been positively withdrawn from the gripper in the manner hereinafter described. During the movement of the gripper 81 with the attached handle at the speed of the platens 32, it is clear that the guide plate 91 guides the gripper and its shank 86 laterally of the push bar 92 by reason of the pin 89 sliding in the slot 90. Also, during the forward movement of the gripper 81, the shank 86 thereof will slide longitudinally in the guide sleeve 87 of the shuttle and the shuttle will move on guide rod 126 laterally of the direction of travel of the platens. Hence, in this particular embodiment of the invention, a compound movement will be imparted to the gripper, both in the general direction of movement of the platens and transversely of such direction, so that the resultant of such compound movements is a movement of the gripper in a generally inclined direction, in relation to the line of travel of the platens, towards the particular envelope which is to be provided with the handle held by the gripper.

When the roller 109 is travelling upon the release incline 105 of the cam 100, the governing mechanism which is controlled by the said cam and the advancing mechanism which is controlled by the lug 80 on each platen are allowed to return to normal position, so that the gripper 81 is also brought back to the normal position shown in Fig. 5. The return of the gripper movement governing mechanism is brought about by the action of the spring 110 on the lever 106, and the return of the handle gripping and advancing mechanism is brought about by reason of the fact that the dog 95 is carried into contact with the tripping member 98 shown in Fig. 9, thus allowing the spring 94 to retract the said advancing mechanism.

*Envelope buckling and slit opening means.*

This portion of the invention is best illustrated in Figs. 3, 5, 9, 10, 13 and 14. The object of this portion of the invention is to open the perforation or slit 35ª in the envelope or other article by buckling or deforming the material directly surrounding the slit, so as to condition the material with a view to facilitating the direction of the terminal of the handle 140 into the slit when the handle is moved as above described, by means of the gripper 81. While the buckling operation around the slit 35ª is being accomplished, the hold-down wire 79ª is acting at its free end to press the mouth portion of the envelope down upon the platen. To serve to properly direct the forward end of the strip 43, from which the minor members or handles are being formed, before a partly formed handle has been gripped by the gripper 81, a hold-down foot 133 is provided, the same being located on the lower end of a rod 134 mounted adjustably upon the punch frame.

Preferably that portion of the buckling means, which is carried by the platens, consists of two adjustable hard metal plates 135, 133ª, plate 135ª being permanently attached by means of its countersunk fastening screws 136, within a depression 137 formed in the upper surface of the platen, and the plate 135 being secured in said depression by countersunk screws 136ª. The slot 79 in each platen also extends between the plates 135, 135ª, so that the slitters 78, before described, can enter the slot 79. The adjustability of the plates enables them to be set so that they will bear more or less on the sides of the slitters 78 as they enter slot 79. The plate 135 is provided with a rib or hump 138, which extends parallel with the slot 79 in the platen, and is located a short distance inwardly from said slot and is adapted to assist in buckling the article on the platen and opening its slit 35ª. The rib or hump 138 is provided with a guiding surface 139 which is inclined upwardly away from the slot 79 in the platen. By this inclined surface the terminal of each handle 140 or minor member is guided as will be hereinafter described.

A stem 141 is mounted so as to be vertically movable in a bracket 141ª mounted rigidly on the supporting bar 66, said stem being held in upper position by means of a spring 142. Located upon the stem 141 is a stop 143 to limit the upward movement of said stem by impinging against bracket 141ª. The stem 141 is adapted to operate on a presser-foot 144, mounted on the lower end thereof, and which is constructed in such a way as to cooperate with the rib or hump 138 for buckling the material of the article on the platen.

The presser-foot 144 extends over the slot 79 in each platen as it is passing the presser-foot 144. With reference to Fig. 14, the right-hand end of the presser-foot has a toe 145 which has an upwardly and outwardly inclined deflecting surface 146. Beyond the toe 145 the presser-foot is provided with an inclined deflecting finger 147. Said deflecting finger 147 and inclined surface 146 prevent the terminal of a minor member or handle from curling upwards away from the platens, for it is necessary to guide the terminal end towards the platens. The left-hand end of the presser-foot 144, with reference to Fig. 14, has a shoe 148 which extends downwardly and towards the toe 145, and has its end portion 149 curved upwardly. It will be observed that the toe 145 of the presser-foot will be located to one side of the slit $35^a$ in the article on the platen, when said slit comes under the presser-foot, that the curved terminal 149 of the shoe 148 will be located to the other side of said slit, and that the rib or hump 138 will be located intermediately of toe 145 and shoe terminal 149. It is obvious that the material of an article having a slit and which is moved along under the toe 145 and shoe 148 of the presser-foot, if the presser-foot is depressed, and over the rib or hump 138, will result in buckling the material of the article and will open up the slit.

As before described, each link-platen 32 is provided with driving holes 73. A toothed wheel 150 is adapted to engage in said holes 73 as the conveyor or endless chain travels, said wheel being fixed on shaft 151 which extends transversely and is supported in bearings on the longitudinal supporting bars 66, 67. The shaft 151 is provided with two tappets 152, 153 arranged diametrically of the shaft, so as to extend in opposite directions. In Fig. 9 one of the tappets is shown as about to come in contact with means for acting on the presser-foot 144, so as to depress the same for the buckling operation. In the position of the parts shown in Fig. 9, the gripper 81 is in normal position and has just gripped a handle or minor member 140.

A presser-foot depressing bar 154 is operable by the tappets 152, 153, to which end the depressing bar 154 is mounted loosely in a bracket 155 which hangs loosely from a shaft 164 hereinafter referred to. The depressing bar 154 is under the influence of a spring 156, which acts to hold the shoulder portion 157 of said bar into contact with the bracket 155. In this way, the depressing bar 154 is yieldingly held in normal position by the stop shoulder 157 and the spring 156. A strip 158 is adjustably mounted upon the depressing bar 154 by means of set screws 159, the said strip having a nose 160 with an inclined face which is adapted to be engaged by one of the tappets 152, 153 with a view to depressing the bar 154.

The nose 160 on the depressing bar 154 is provided back of the high point of the inclined face thereof with a square shoulder $160^a$, so that if the shaft 151 was accidentally turning in the wrong direction, the tappets thereon would strike the square shoulder $160^a$ and push the bar 154 backwardly against the action of the spring 156, and the presser-foot 144 would not be operated and thus pressed down upon the material which is to be buckled up. This renders the machine fool-proof. In order that the depressing bar 154 may act to operate on the presser-foot to depress it, the said bar is provided with an elongated fork 161 which is in loose engagement with a reduced or notched portion of the stem 141, so that the said bar is held against rotation.

The operation of the article buckling and slit opening means is as follows:

As the gripper 81 moves with a gripped handle 140 from the normal position, shown in Fig. 5, to the position shown in Fig. 12, it will be remembered that the resultant of the combined movements imparted to the gripper is on a slant with respect to the line of travel of the articles, or rather, the line of movement of the slits $35^a$ in the articles. While the gripper and the gripped handle are so moving, the article on the platen, which has arrived in the location where a handle or minor member 140 is to be applied, will have its material buckled up at the slit in the article in some such manner as is shown in Fig. 14. The inwardly moving minor member or handle, carried by the gripper 81, will, as shown in Fig. 14, have its terminal deflected by reason of its movement against the deflecting surfaces 147, 146 on the presser-foot, and the nose 145 of the presser-foot will press the said terminal against the material of the article which is at the outer side of the slit $35^a$ therein, so that the continued inward movement of the handle or minor member 140 will push the said terminal into the opened slit to preliminarily insert it as shown in Fig. 11. It will be understood that at this moment the inward shoe 148 is bearing upon the material of the envelope and pressing the material at a point adjacent to the slit, upon the rib or hump 138, so that the slit is opened up in both directions away from the general plane of the envelope. While this preliminary introduction of the handle or minor member into the slit $35^a$ is occurring, the tappet 152 is bearing on the inclined face of the nose 160 of the depressing bar, to move it to the position shown in dotted lines in Fig. 9, and the cam roller 109 on lever 106 is bearing upon the first inclined face 101 of the cam 100, which has been before explained. In other words, the inclined face 101 on the cam is to impart a momentary action to the buckling mechanism sufficient to buckle the material of the article and open its slit; however, this is accomplished while the platens are in motion without halt. After the opening of the slit of an article the tappet 152 for example and which has just engaged with the nose 160 of bar 154 to depress the presser-foot 144, passes the nose 160, as shown in Fig. 10, and the presser-foot is immediately raised by the action of the spring 142. This escapement of the presser foot 144 takes place while the cam roller 109 is on the first dwell face 102. Further action of the buckling mechanism is not required at this time because the terminal of minor member 140 has been preliminarily introduced into slit 35ª. It is now a very simple matter for the minor member applying motion of the gripper to complete the insertion of the minor member into the slit, as shown in Fig. 12; all while the envelope is in motion. The complete insertion of the minor member into slit 35ª is facilitated by reason of its terminal being deflected and guided by the incline 139 of the rib, or hump 138, and such complete insertion, as shown in Fig. 12 is done while the cam roller 109 is bearing on the second inclined face 103 of the cam.

The tappet shaft 151 supports a pressure roller 162, which is so located on the said shaft as to engage a minor member, already applied to an article, when the article and the minor member pass under it. The function of this roller 162 is to pull the minor member 140, which has been fully inserted into the slit 35ª of an article, away from the gripper 81 holding it and also to press the base of the handle or minor member upon the gum which has been applied to the article, preliminary to the insertion of a minor member into the slit of the article, as before explained.

The principal operations of the specifically described conditioning and the minor member applying and attaching mechanism may be comprehensively seen from the diagram, Fig. 15, which shows certain steps in succession, namely: the step "A" of slitting by slitter 78 those walls of envelopes 35 to which the closure flaps are attached, and which step may involve gumming by gummer 74; step "B" which shows an envelope after its flap has been gummed and a handle 140 has just been gripped by the gripper 81; step "C" which shows that the gripper has been given a movement sufficient to preliminarily introduce the terminal of a handle into the opened slit 35ª of the envelope; step "D" which shows that the gripper 81 has completed its movement inwardly for the insertion of the handle into the slit to apply the handle to the envelope; and step "E" which shows the gripper as having completed its advancing motion in the direction of movement of the envelopes so that the minor member has been brought in contact with the pressure roller 162 which is about to withdraw the handle from the gripper.

*Printing means.*

The printing means is sufficiently illustrated in Figs. 1, 9 and 10, and comprise a toothed wheel 163 which is adapted to constantly mesh with the carrying holes 73 of the link-platens as the platens travel along, and this wheel is mounted upon a shaft 164 which is journaled in bearings of the longitudinal supporting bars 66, 67. Upon the shaft there are printing segments 165, the printing faces of which may be constructed in any well known manner to preferably print or emboss the minor members attached to the articles carried along by the endless conveyor.

*Envelope supply mechanism.*

This mechanism is intended to deliver envelopes having open closure flaps from an envelope making machine to the machine involved herein, and constitutes a transfer means which may be of any desired construction, and the construction is shown more or less diagrammatically in Figs. 19 and 20, these being merely for the sake of explanation and to generally show means for rapidly delivering envelopes to the machine from the envelope machine. Reference may also be had to Fig. 1 which indicates the envelope supply or transfer mechanism in dotted lines, and by a lateral arrow indicates the direction of movement of the envelopes to the present machine.

To take the envelopes 35 from the envelope machine rollers 170, 171 are provided, the same advancing the number of envelopes continuously and off-setting them within their pass. The envelopes thus partly offset will be further offset by reason of being carried upwardly at an incline, the carrying means comprising a pair of rollers 172, another pair of rollers 173 and a third pair of rollers 174, the passes between the pairs being arranged on an incline to furnish an inclined pass for the envelopes. The lower ones of the pairs of rollers 172, 173, 174 are of increased diameter successively away from the rollers 170, 171, so that a stepped-up peripheral speed may be imparted to the lower rollers by their drive belt. The result will be that the envelopes will be progressively and quickly separated from each other and will follow each other in rapid succession when they have reached a pair of take-off rollers 175, 176.

As above explained, each platen is provided with gages 34 and there is another gage 36. As each platen is carried to a place opposite the envelope supply mechanism (see Fig. 1), the gage 36 will stop the movement of each envelope onto the present machine, so that one envelope at a time will be deposited upon a platen.

Preferably located opposite the envelope supply mechanism and above the platen conveyor, there is a flexible centering member 177, which may be in the form of a cylindrical brush. The frame 25 of the machine is provided with bearings 178, 179, and these bearings are so arranged as to support at an inclination a shaft 180 on which the flexible centering member 177 is mounted. The shaft 180 is continuously rotated by suitable means so that as each envelope or other article is delivered onto a platen under the centering member 177, the inclination at which the centering member is arranged will enable the said member to push the article or envelope delivered into the angle formed between the gages 34 and the gage 36. The article or envelope supported on the platen will thus be centered thereon and will be in proper position for the conditioning or other work which is subsequently to be performed thereon.

*Means for securing clasp fasteners to envelopes.*

This embodiment of the invention is shown in Figs. 21 to 24 inclusive. In these views of this modification, the instrumentalities for actually applying and permanently securing clasp fasteners to envelopes or other sheet articles are shown, together with such parts of the preferred form of the invention as are necessary to show how such instrumentalities may be adapted to the preferred form.

The link-platens 32 of the endless conveyor are here shown as imperforate, and no preliminary perforation of the center-seam clasp-envelope type of envelopes, such as 182, is presumed to have taken place. Parts 87, 131 of the shuttle and parts of the operating link 123, tappet shaft 151 and depressing bar 154 are shown.

In this modification a metallic clasp fastener 183 having a single clasp-wing is to be applied to an envelope 182 by means of a gripper 184 which is rigidly mounted on the shank 86. The envelopes are moving continuously past the punch 185, indicated in dotted lines in Fig. 21, which punches and cuts off fasteners or closure members 183 from an intermittently fed metallic strip 186. The gripper comprises a lower jaw 187 and a spring upper jaw 188, the two jaw extending at right angles to a member 189 which is integral with jaw 187. At a point remote from the jaws 187, 188 and in line with the longitudinal axis of the strip 186, the member 189 has an anvil 189$^a$ which is recessed to upset the eyelet or rivet 183$^a$ which has been formed on the fastener 183 by the punch 185, as shown in Figs. 23 and 24, the terminal of the clasp wing being gripped by the jaws 187, 188 to hold the eyelet 183 in register with the anvil 189$^a$.

Guard fingers 190 of spring metal are fixed at one end to the gripper-jaw 187, and extend inwardly in parallelism away from said jaw so that the fastener 183 held by the jaws is located between the fingers 190. A riveting tool or upsetter 191 is rigidly fixed in the adjacent end of the depressing bar 154.

In operation, the jaws of gripper 184 will take the clasp fasteners 183 successively away from the punch 185 and will carry a fastener, with its eyeleted end foremost, towards the center-seam envelope which is in continuous motion. The movement of the gripper is controlled of course in the same or some such way as before described. The anvil member 189 and the fastener 183 will be pushed over the opposite surfaces of the non-flap wall of the envelope 182, so that they are in the position shown in Figs. 22 and 23. At the proper time, the depressing bar 160 will be operated by tappet 152 so as to cause the riveting tool 191 to upset the eyelet 183$^a$ against anvil portion 189$^a$ and permanently secure the fastener to the envelope.

It will be obvious to those skilled in the various arts to which this invention is applicable that the invention may be variously modified as by omitting and adding mechanism or by substituting other equivalent mechanism, without departing from the spirit and scope of the invention as defined in the claims.

What I claim as new is:

1. The method herein described, including moving sheet articles, in substantially flat form continuously in succession past a location where minor members are to be applied, and delivering the minor members to and immediately connecting them interlockingly with the actual material of the articles at such location while the articles are moving.

2. The method herein described, including moving perforated sheet articles continuously in succession past a location where minor members are to be applied, guiding the minor members in succession to, and applying them at such location into the perforations of the articles, while the articles are moving.

3. The method herein described, including moving perforated sheet articles continuously in succession past a location where minor members are to be applied, and guiding the minor members in succession to, applying them at such location into the perforations of the articles, and permanently securing the minor members as so guided, and applied, to the articles, all while the articles are moving.

4. The method herein described, including moving envelopes having perforations adjacent their mouths, continuously in succession past a location where minor members are to be applied, and guiding the minor members in succession into the perforations, while they are at such location.

5. The method herein described, including moving separated envelopes continuously in succession past a location where closure members are to be applied, and guiding the closure members in succession to and assembling them with the material of the envelopes while the envelopes are moving.

6. The method herein described, including moving separated envelopes continuously in succession past a location where closure members are to be applied, and guiding the closure members in succession to and assembling them with the material of the envelopes and also securing the closure members in the material while the envelopes are moving.

7. The method herein described, which includes: moving envelopes continuously in succession, and advancing minor members in the form of handles simultaneously with, and in the same general direction of movement as, the envelopes, while simultaneously moving the handles laterally of the direction of movement of their advance and towards corresponding edges of the envelopes for applying them to the envelopes.

8. The method herein described, which includes: perforating envelopes, moving the envelopes continuously in succession, and advancing minor members in the form of handles simultaneously with, and in the same general direction of movement as, the envelopes, while simultaneously moving the handles laterally of the direction of movement of their advance and towards corresponding edges of the envelopes to insert them in the perforations of the envelopes.

9. The method herein described, which includes: moving envelopes continuously in succession while slitting each transversely in the wall carrying the flap, and advancing minor members in the form of handles simultaneously with, and in the same general direction of movement as, the envelopes while simultaneously moving the handles laterally of the direction of movement of their advance, and inserting the handles in said slits without interruption of movement of the envelopes.

10. The method herein described, which includes: moving envelopes continuously in succession while slitting each transversely in the wall carrying the flap, and advancing minor members in the form of handles simultaneously with, and in the same general direction of movement as, the envelopes while simultaneously moving the handles laterally of the direction of movement of their advance, inserting the handles in said slits without interruption of movement of the envelopes, and permanently securing the handles to the flaps of the envelopes.

11. The method herein described, which includes: providing an envelope with a transverse slit in one of its walls, inserting a part of a minor member in such slit, and permanently attaching the minor member to the envelope, said steps being performed while the envelope is in continuous motion.

12. The method herein described, which includes: inserting a minor member in the form of a handle in a perforation in an envelope, and attaching the handle to the envelope flap, both steps performed while the envelope is in motion.

13. The method herein described, which includes: perforating an envelope near the mouth, and inserting a minor member in the form of a handle in the perforation, the insertion being performed while the envelope is in motion.

14. The method herein described, which includes: inserting a handle through the material of an envelope while the envelope is in motion.

15. The method herein described, which includes: perforating an envelope in the wall carrying the flap, buckling the material of the envelope to open the perforation, and inserting a minor member in the form of a handle into the perforation while the same is opened, the said steps being performed while the envelope is in motion.

16. The method herein described, which includes: moving perforated articles continuously in succession past a location where minor members are to be applied, buckling the material of each article to open the perforation, and inserting each minor member into a perforation while the same is opened at such location, and while the articles are in motion.

17. The method herein described, which includes: gumming the flaps of envelopes, transversely slitting that wall of each envelope which carries a flap at its mouth, buckling the material of each envelope to open the slit, inserting a handle into the opened slit of each envelope, and attaching the handle to the gummed part of the flap.

18. The method herein described, which includes: transversely slitting that wall of an envelope which carries a flap at its mouth, buckling the material of the envelope to open the slit, inserting a handle into the opened slit of the envelope, and securing the flap and handle together.

19. The method herein described, which includes: gumming envelope flaps, and pressing handles and the flaps together so as to attach them together while the envelopes are in motion.

20. In a machine of the class described, the combination of means for moving articles, in substantially flat form, continuously in substantially one plane and in progressive succession past a location where minor fastening members are to be applied, and means movable in a direction lateral of the direction of movement of the articles for separately delivering the minor fastening members intermittently to and applying them to the flat articles at such location while the articles are in motion.

21. In a machine of the class described, the combination of means for moving articles, in substantially flat form, continuously in succession past a location where minor members are to be applied, and means for delivering the minor members to and immediately connecting them interlockingly with the actual material of the articles at such location while the articles are moving.

22. In a machine of the class described, the combination of means for moving perforated sheet articles continuously in succession past a location where minor members are to be applied, and means for guiding the minor members in succession to, and applying them at such location into the perforations of the articles, while the articles are moving.

23. In a machine of the class described, the combination of means for moving perforated sheet articles continuously in succession past a location where minor members are to be applied, means for guiding the minor members in succession to, and applying them at such location into the perforations of the articles, and means for permanently securing the minor members as so guided, and applied, to the articles, all while the articles are moving.

24. In a machine of the class described, the combination of means for moving envelopes having perforations adjacent their mouths, continuously in succession past a location where minor members are to be applied, and means for guiding the minor members in succession into the perforations while they are at such location.

25. In a machine of the class described, the combination of means for moving separated envelopes continuously in succession past a location where closure members are to be applied, and means for guiding the closure members in succession to and assembling them interlockingly with the material of the envelopes while the envelopes are moving.

26. In a machine of the class described, the combination of means for moving separated envelopes continuously in succession past a location where closure members are to be applied, and means for guiding the closure members in succession to and assembling them with the material of the envelopes while the envelopes are moving, and means for securing the closure members in the material while the envelopes are still moving.

27. In a machine of the class described, the combination of means for moving envelopes continuously in succession, means for advancing minor members in the form of handles simultaneously with, and in the same general direction of movement as, the envelopes, and means for simultaneously moving the handles laterally of the direction of movement of their advance and towards corresponding edges of the envelopes for applying them to the envelopes.

28. In a machine of the class described, the combination of means for perforating envelopes, means for moving the envelopes continuously in succession, means for advancing minor members in the form of handles simultaneously with, and in the same general direction of movement as, the envelopes, and means for simultaneously moving the handles laterally of the direction of movement of their advance and towards corresponding edges of the envelopes to insert them in the perforations of the envelopes 29. In a machine of the class described, the combination of means for moving envelopes continuously in succession, means for slitting each envelope transversely in the wall carrying the flap, means for advancing minor members in the form of handles simultaneously with, and in the same general direction of movement as, the envelopes, and means for simultaneously moving the handles laterally of the direction of movement of their advance, and inserting the handles in said slits without interruption of movement of the envelopes.

30. In a machine of the class described, the combination of means for moving envelopes continuously in succession, means for slitting each envelope transversely in the wall carrying the flap, means for advancing minor members in the form of handles simultaneously with, and in the same general direction of movement as, the envelopes, means for simultaneously moving the handles laterally of the direction of movement of their advance, inserting the handles in said slits without interruption of movement of the envelopes, and means for permanently securing the handles to the flaps of the envelopes.

31. In a machine of the class described, the combination of means for slitting an envelope transversely in one of its walls, means for inserting a part of a minor member in the slit, and means for permanently attaching the minor member to the envelope.

32. In a machine of the class described, the combination of means for slitting an envelope transversely in one of its walls, means for inserting a part of a minor member in the slit, means for permanently attaching the minor member to the envelope, and means for performing the steps of inserting and attaching while the envelope is in continuous motion.

33. In a machine of the class described, the combination of means for inserting a minor member in the form of a handle in a perforation in an envelope, means for attaching a handle to the envelope flap, and means for performing the steps of inserting and attaching while the envelope is in motion.

34. In a machine of the class described, the combination of means for perforating an envelope near the mouth, and means for inserting a minor member in the form of a handle in the perforation, while the envelope is in motion.

35. In a machine of the class described, the combination of means for moving envelopes continuously in succession, and means for inserting handles into the material of the envelopes while they are in motion.

36. In a machine of the class described, the combination of means for perforating an envelope in the wall carrying the flap, means for buckling the material of the envelope to open the perforation, and means for inserting a minor member in the form of a handle into the perforation while the same is opened.

37. In a machine of the class described, the combination of means for slitting an envelope transversely in the wall carrying the flap, means for buckling the material of the envelope to open the slit, and means for inserting a minor member in the form of a handle into the slit while the same is opened.

38. In a machine of the class described, the combination of means for perforating an envelope in the wall carrying the flap, means for buckling the material of the envelope to open the perforation, while the envelope is in motion, and means for inserting a minor member in the form of a handle into the perforation while the same is opened, and also while the envelope is in motion.

39. In a machine of the class described, the combination of means for perforating an article, means for buckling the material of the article to open the perforation, and means for inserting a minor member into the perforation while the same is opened.

40. In a machine of the class described, the combination of means for moving perforated articles continuously in succession past a location where minor members are to be applied, means for buckling the material of each article to open the perforation, and means for inserting a minor member into each perforation while the same is opened at such location, and while the articles are in motion.

41. In a machine of the class described, the combination of means for gumming the flaps of envelopes, means for transversely slitting that wall of each envelope which carries a flap at its mouth, means for buckling the material of each envelope to open the slit, means for inserting a handle into the opened slit of each envelope, and means for attaching the handle to the gummed part of the flap.

42. In a machine of the class described, the combination of means for transversely slitting that wall of an envelope which carries a flap at its mouth, means for buckling the material of the envelope to open the slit, means for inserting a handle into the opened slit of the envelope, and means for securing the flap and handle together.

43. In a machine of the class described, the combination of means for gumming envelope flaps, and means for pressing handles and the flaps together and uniting them while the envelopes are in motion.

44. In a machine of the class described, the combination of a travelling endless chain comprising link-platens for supporting sheet articles, supporting means on which the chain is mounted, and recessed gage means at the receding edges of the link-platens to engage the rear edges of the articles.

45. In a machine of the class described, the combination of an endless chain comprising link-platens for supporting sheet articles, supporting means on which the chain is mounted, and gage means at the receding edges of the link-platens to engage the rear edges of the articles, with a stationary gage at right angles to aforesaid gage means and in engagement with the platens.

46. In a machine of the class described, the combination of an endless chain comprising link-platens for supporting sheet articles, supporting means on which the chain is mounted, and gage means at the receding edges of the link-platens to engage the rear edges of the articles, with a stationary gage at right angles to aforesaid gage means, said link-platens being provided with grooves in which the stationary gage engages.

47. In a machine of the class described, the combination of a supporting frame, an endless conveyor mounted thereon for supporting sheet articles, strip feeding and minor member forming mechanism, means for imparting continuous motion to the conveyor, means for imparting an intermittent motion to the strip feeding and minor member forming mechanism, and means for applying the minor members to the articles during the continuous motion.

48. In a machine of the class described, the combination of a supporting frame, an endless conveyor mounted thereon for supporting sheet articles, strip feeding and minor-member-forming mechanism, means for imparting continuous motion to the conveyor, means for imparting an intermittent motion to the strip feeding and minor-member-forming mechanism, and means for gripping the minor members and advancing them at substantially the speed of the conveyor and for applying the minor members to the articles.

49. In a machine of the class described, the combination of a supporting frame, a conveyor mounted thereon for supporting sheet articles, strip feeding and minor-member-forming mechanism, means for imparting continuous motion to the conveyor, means for imparting an intermittent motion to the strip feeding and minor-member-forming mechanism, means for transferring the minor members to the articles, and means for removing curvature of the strip.

50. In a machine of the class described, the combination of a supported endless conveyor for supporting envelopes and their flaps, mechanism for gumming the flaps of the envelopes, and means for perforating the envelopes.

51. In a machine of the class described, the combination of a supported endless chain composed of link-platens, mechanism for gumming articles supported by the platens, and means for driving said gumming mechanism from the link-platens, with means for slitting the articles.

52. In a machine of the class described, the combination of a conveyor for supporting envelopes with flaps, means for gumming the outer ends of the flaps, and means for transversely slitting those walls of the envelopes which carry the flaps.

53. In a machine of the class described, the combination of means for supporting sheet articles, a driven shaft, a gummer mounted on said shaft, and a slitter also mounted on said shaft, whereby the articles are both gummed and slit simultaneously.

54. In a machine of the class described, a platen for supporting an envelope provided with an open flap having a fold-line, said platen having a perforation, and a perforator co-acting with the perforation in the platen to form a perforation in the wall of the envelope which carries the flap but at a point nearer to the fold-line than the edge of the flap is to the fold-line.

55. In a machine of the class described, the combination of a supported, travelling, endless chain, comprising link-platens for supporting flap envelopes, each platen having a slot extending in the direction in which the chain moves, and a slitter adapted to enter each slot and form a slit in the envelope along a line parallel with the fold-line of the flap.

56. In a machine of the class described, the combination of means for supporting envelopes, means for advancing the supporting means towards a location where a minor member in the form of a handle may be applied to the envelope, means for gripping the handle, means for operating the gripper to move the handle for applying it to the envelope, means for securing an end of the handle to the envelope, and means for actuating the gripper means from the envelope supporting means.

57. In a machine of the class described, the combination of a supported endless chain comprising link-platens, a carrying lug on each of said platens, a gripper for transferring minor members to articles supported on the platens, means for operating the gripper, comprising a dog for engagement by each of the carrying lugs, and tripping means for throwing the dog out of engagement with each lug when a minor member has been applied to the corresponding article.

58. In a machine of the class described, the combination of means for feeding minor members, means for gripping the minor members and applying them to articles, movable means for holding the gripper in normal position with respect to the articles, and means for preventing the movement of said movable means, and hence the movement of the gripper from its normal position, when a minor member is being fed to the gripper.

59. In a machine of the class described, the combination of means for feeding minor members, means for gripping the minor members and applying them to articles, means comprising a spring for holding the gripper in normal position with respect to the articles, and means for preventing a movement of the gripper from its normal position and the overcoming of the spring action when a minor member is being fed to the gripper.

60. In a machine of the class described, the combination of means for feeding minor members, means for gripping the minor members and applying them to articles, means for holding the gripper in normal position with respect to the articles, means for locking said holding means and preventing movement of the gripper from its normal position when a minor member is being fed to the gripper, and power operated means for acting on said holding means and overcoming the locking action.

61. In a machine of the class described, the combination of means for moving articles forward, means for gripping minor members and moving them along with the articles, and means for laterally deflecting the gripper means to apply the minor members to the articles.

62. In a machine of the class described, the combination of means for moving articles for the application of minor members, a gripper for the minor members, a shiftable bar laterally of which the gripper is movable, and means for moving the bar and the gripper in the same direction as that in which the articles move.

63. In a machine of the class described, the combination of means for moving articles for the application of minor members, a gripper for the minor members, a shank for carrying the gripper, a shiftable bar on which the gripper-shank is mounted for lateral movement, and means for moving the bar, shank and gripper in a direction corresponding with that in which the articles move.

64. In a machine of the class described, the combination of means for moving articles for the application of minor members, a gripper for the minor members, a shank for carrying the gripper, a shiftable bar on which the gripper-shank is mounted for lateral movement, a stationary lateral guide for the gripper and its shank, and means for moving the bar, shank and gripper in a direction corresponding with that in which the articles move.

65. In a machine of the class described, the combination of means for moving articles forward for the application of minor members, a gripper for the minor members, means for moving the gripper in substantially the direction of movement of the articles, and means for guiding the gripper transversely of the direction of movement of the articles.

66. In a machine of the class described, the combination of a supported endless chain comprising link-platens for supporting articles, a cam on each platen, a movable gripper for minor members, and means actuated by each cam for governing the movement of the gripper and to apply a minor member to each article.

67. In a machine of the class described, the combination of a supported endless chain comprising link-platens for supporting articles, a cam on each platen, a movable gripper for the minor members, means actuated by each cam for governing the movement of the gripper and to apply a minor member to each article, and means for overcoming the action of said cams and moving the gripper to normal position.

68. In a machine of the class described, the combination of a platen for supporting an article, means for moving the platen in a direction for the application of a minor member, a gripper for the minor member, and cam actuated means operated from the platen for moving the gripper towards the article on the platen to apply the minor member to such article.

69. In a machine of the class described, the combination of a platen for supporting a perforated article, deforming means on the platen for acting on the article, and means co-operating with the deforming means to buckle, in the region of the perforation, the material of the article supported on the platen to permit the association of a member with the article.

70. In a machine of the class described, the combination of a platen for moving a perforated article, and means for buckling, in the region of the perforation, the material of the article to permit the association of a member with the article while it is moving.

71. In a machine of the class described, the combination of a platen for conveying a slitted article, means for buckling the material of the article and opening its slit, and means for inserting a minor member into the slit.

72. In a machine of the class described, the combination of a platen provided with a depression, deforming means in the depression, and means co-operating with the deforming means for buckling the material of a perforated article which is depressed into said depression whereby the association of a member with the article is permitted.

73. In a machine of the class described, the combination of a platen, a hump on the platen, and means co-operating with said hump to buckle the material of a perforated article on the platen whereby the association of a member with the article is permitted.

74. In a machine of the class described, the combination of a platen for supporting a slitted article, means for buckling the material of the article at the slit, means for inserting a minor member into the slit, and means for deflecting the inserted end of the minor member after it is inserted into said slit.

75. In a machine of the class described, the combination of a platen, and means for buckling the material of a perforated article on the platen, whereby the association of a minor member with the article is permitted, said means comprising a presser-foot for engaging the article and also for engaging the minor member when it is being applied to the article.

76. In a machine of the class described, the combination of a supported endless chain comprising link-platens for conveying articles having slits, a gripper, means for moving the gripper to apply minor members to the articles, and means for buckling the material of each article about its slit to enable the insertion of a minor member by the gripper.

77. In a machine of the class described, the combination of means for conveying separated sheet articles in flat form in continuous succession, intermittently operated means for feeding minor members, means for receiving the minor members from the feeding means and applying them in succession to the articles, and means timed from and intermittently operated by the conveying means for acting on the receiving and applying means to successively apply minor members to the successive articles while the articles on the conveying means are in motion.

78. In a machine of the class described, the combination of means for conveying separated sheet articles in flat form in continuous succession, intermittently operated means for feeding minor members, means for receiving the minor members from the feeding means and applying them in succession to the articles, cam means controlled by the conveying means, and means timed by the cam means and intermittently operating on the receiving and applying means to cause it successively to apply minor members to the successive articles while the articles on the conveying means are in motion.

79. In a machine of the class described, the combination of an endless chain having link-platens for conveying separated sheet articles in flat form in continuous succession, means for successively applying minor members to the articles, a cam on each link-platen, and means timed by the cams and intermittently operating on the applying means to cause it to successively apply the minor members to the successive articles while the articles on the conveying means are in motion.

80. In a machine of the class described, the combination of means for conveying separated sheet articles in flat form in continuous succession, intermittently operated means for feeding minor members, means for receiving the minor members from the feeding means and applying them in succession to the articles, and timed means for acting on the receiving and applying means to successively apply minor members to the successive articles while the articles on the conveying means are in motion.

GEORGE C. SNYDER.